United States Patent [19]
Hakkarainen

[11] Patent Number: 5,648,711
[45] Date of Patent: Jul. 15, 1997

[54] METHOD AND SWITCHING ARRANGEMENT FOR IDENTIFYING THE CHARGER OF RECHARGABLE BATTERIES OF PORTABLE DEVICES

[75] Inventor: Kalle Hakkarainen, Salo, Finland

[73] Assignee: Nokia Mobile Phones Ltd., Salo, Finland

[21] Appl. No.: 434,934

[22] Filed: May 4, 1995

[30] Foreign Application Priority Data

May 16, 1994 [FI] Finland .................................... 942271

[51] Int. Cl.$^6$ ................................................. H01M 10/44
[52] U.S. Cl. ................................................. 320/2; 323/283
[58] Field of Search ...................... 323/282, 283, 323/284, 351; 320/2, 5, 15, 23

[56] References Cited

U.S. PATENT DOCUMENTS

| | | | |
|---|---|---|---|
| 3,610,828 | 10/1971 | Girard et al. | 179/1.5 S |
| 4,024,528 | 5/1977 | Boggs et al. | 340/310 |
| 4,634,903 | 1/1987 | Montorfano | 307/571 |
| 5,164,652 | 11/1992 | Johnson et al. | 320/2 |
| 5,254,931 | 10/1993 | Martensson | 320/22 |
| 5,506,490 | 4/1996 | DeMuro | 320/23 |

FOREIGN PATENT DOCUMENTS

| | | | |
|---|---|---|---|
| 0038877 | 11/1981 | European Pat. Off. | H02J 13/00 |
| 0409226A3 | 1/1991 | European Pat. Off. | H02J 3/00 |
| 3528659A1 | 2/1987 | Germany | H02J 7/00 |

*Primary Examiner*—Peter S. Wong
*Assistant Examiner*—Gregory J. Toaley, Jr.
*Attorney, Agent, or Firm*—Perman & Green, LLP

[57] ABSTRACT

The object of the Invention is a method and a switching arrangement for identifying the charger of the rechargeable batteries of portable devices. In the solution according to the invention the charger transmits the identification of the charger via a charging cable by switching the charging voltage on and off by using a certain pulse ratio, pulse length, or pulse count. The solution according to the invention can be applied in mobile phone sets.

13 Claims, 2 Drawing Sheets

METHOD AND SWITCHING ARRANGEMENT FOR IDENTIFYING THE CHARGER OF RECHARGABLE BATTERIES OF PORTABLE DEVICES

FIELD OF INVENTION

The present invention relates to identification apparatus and a method therefor.

In particular, it relates to apparatus and method for accessory devices of electronic devices such as portable telephones.

BACKGROUND TO INVENTION

There are many types of peripheral devices used with electronic devices. A particularly common accessory device is a battery charger for portable devices such as portable telephones The present invention will now be discussed in terms of the state of the art and by way of example, with reference to battery chargers.

There are a number of known methods for charging rechargeable batteries for portable devices, such as nickel-cadmium batteries. Many of these chargers require the removal of the batteries from the device to enable recharging. Removal of the batteries from the device is considered a drawback, since the device is out of operation during the recharging. However, a number of different chargers have been developed which can be attached to a battery powered device and the batteries charged in situ in the device. In this way, the functionality of the device can be maintained while charging the batteries. Even though the functionality of the device is maintained, a portable device, such as a mobile phone, is unavailable for operation in the manner intended, i.e., as a portable device. Since chargers often recharge a battery using a fairly low charging current, the battery powered device is not available for portable operation for extended periods of time, such as eight hours or more during which time the batteries are being recharged.

Many battery powered devices, such as mobile phones, are extremely energy intensive, expending considerable amounts of power during the receive functions and more particularly during the transmit functions. Because of lengthy recharging times, "rapid" chargers have been developed which can charge batteries fairly rapidly, for example In less than an hour as compared with the charging time of eight hours for previous battery chargers.

In order to charge batteries rapidly, numerous problems had to be overcome. One of the most serious problems was overcharging of the batteries, resulting in turn in the overheating of the batteries. Overheating may damage the battery case seals, resulting in rupturing of the battery case and In extreme instances in explosive rupturing of the battery case.

In known "rapid" battery chargers most of these problems have been solved in one way or another, e.g., by monitoring given battery parameters, such as the charging rate of the battery, internal battery temperatures or charge state of the battery. In some "rapid" chargers, attempts have been made to prevent overcharging of the batteries by utilizing timed charging of the battery. However, using these known solutions It Is not always possible to prevent overcharging of batteries, for instance, when the charger type is not exactly a correct one or designed to be used with the battery being charged.

Numerous different types of chargers are on the market which comprise different charging capacities and charging parameters for charging rechargeable batteries of portable devices. Some chargers can even be unsuitable, i.e., hazardous for the batteries. Consequently, portable devises should be able to somehow identify the charger and its properties. Similar problems exist for accessory devices generally for all types of electronic device, not just battery chargers or portable telephones.

BRIEF SUMMARY OF INVENTION

According to a first aspect of the present invention, there is provided identification apparatus for an accessory device, comprising coupling means for coupling the accessory device to an electronic device and modulation means for modulating a signal on the coupling means in accordance with identity data for the accessory device.

According to a second aspect of the present invention, there is provided an identification method for an accessory device, comprising transmitting an Identity signal from the accessory device to an electronic device coupled thereto by modulating a signal transmitted therebetween In accordance with identity data for the accessory device.

The present invention provide the advantage that the accessory device can indicate to an electronic device to which it is connected which peripheral device it is. Thus, there is provided a solution to a problem of identifying accessory devices.

In a preferred embodiment the modulation means comprises a switch means operable to activate and de-activate the coupling means.

Preferably, the Identification apparatus further comprises a bit generator or corresponding charger for generating the identity data.

Suitably, there is provided control means adopted to control the modulation means in accordance with the identity data for superimposing a pulse ratio, pulse length, pulse count or the like signal on the on the coupling means.

Advantageously, there is provided timing means for determining a time during which the modulation means is operable, in particular the timing means comprises a timer and a switch operable in accordance with the timer to decouple the identity data from the control and/or modulation means.

Optionally, the switch means comprises a switching transistor or field effect transistor.

Identification may be implemented after a certain start-up period, before operation, e.g. charging, is started or in the initial stage of operation of the accessory device.

DETAILED DESCRIPTION OF EMBODIMENTS IN ACCORDANCE WITH THE INVENTION

Embodiments in accordance with the Invention are now described, by way of example only, and with reference to the appended drawings.

In a device in accordance with the invention a battery charger for a transportable device transmits an Identification code for the charger via a charging cable, by switching the charging voltage on and off using a certain pulse ratio or pulse length or pulse count. Such identification can be implemented after a certain start-up time or before starting an actual charging routine It can also be carried out in the initial stage of charging after having switched the charging on or entered a charging routine.

Figure 1:
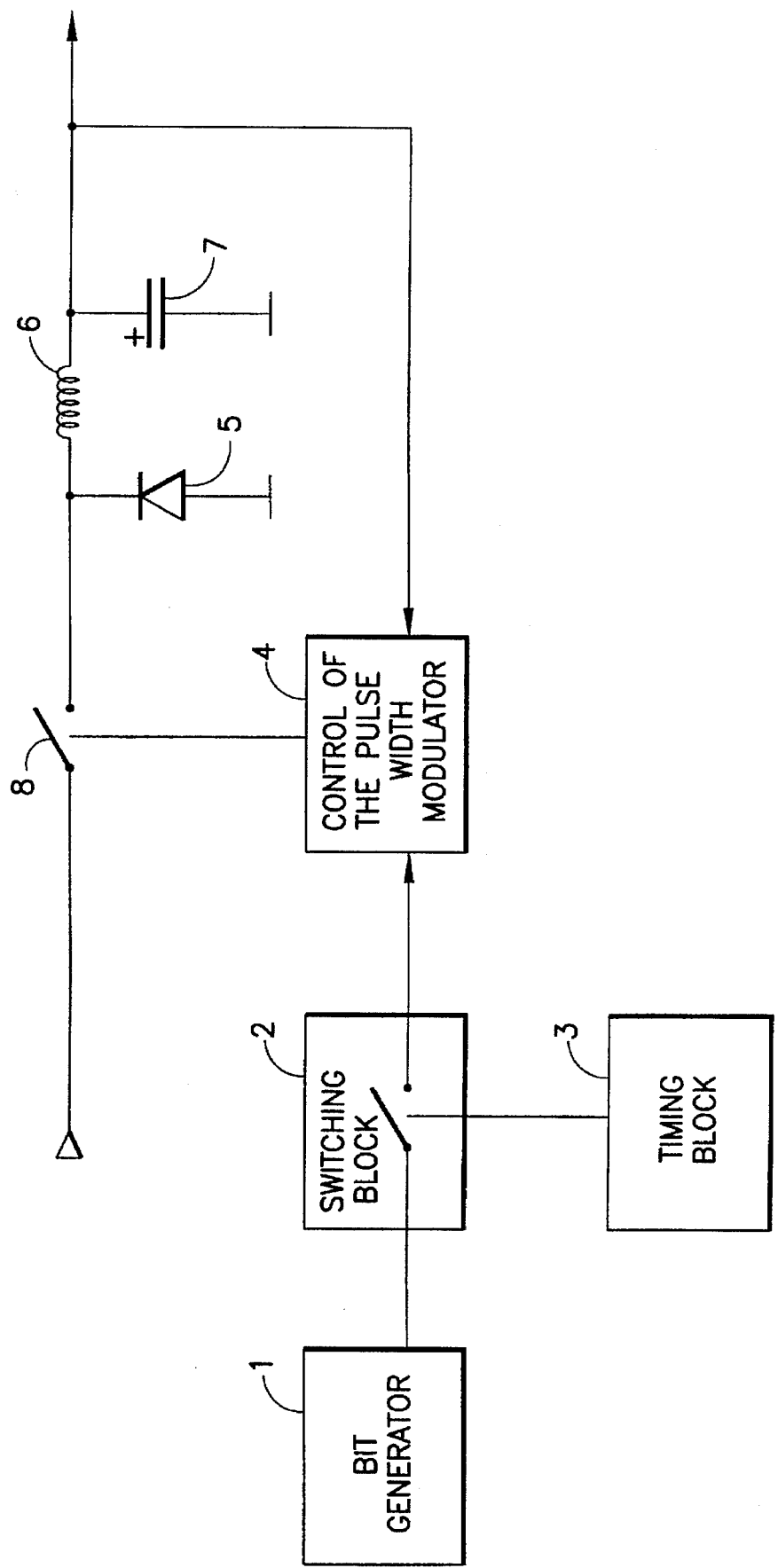
FIG. 1 shows a diagrammatic illustration of the implementation of apparatus in accordance with the invention.

FIG. 1 shows an implementation of an embodiment in accordance with the Invention. The Identification of the charger is formed by using bit generator 1 from which the Identification is taken via switching block 2, controlled by timing block 3, to control block 4 of a pulse width modulator. A switching transistor or field effect transistor functions as switch 8 and takes a charging voltage containing the identification as a modulation imposed thereon, via inductance 6 to the output of the charger. Timing block 3 can also operate to control switch 8 to stay on after the pulse identification has been transmitted from the charger, The main circuit comprises, in a known manner, parallel diode 5 and parallel capacitor 7 coupled to ground. The charging voltage may be the output of a DC/DC converter, the output of which is then switched on or off by switch 8.

Figure 2:
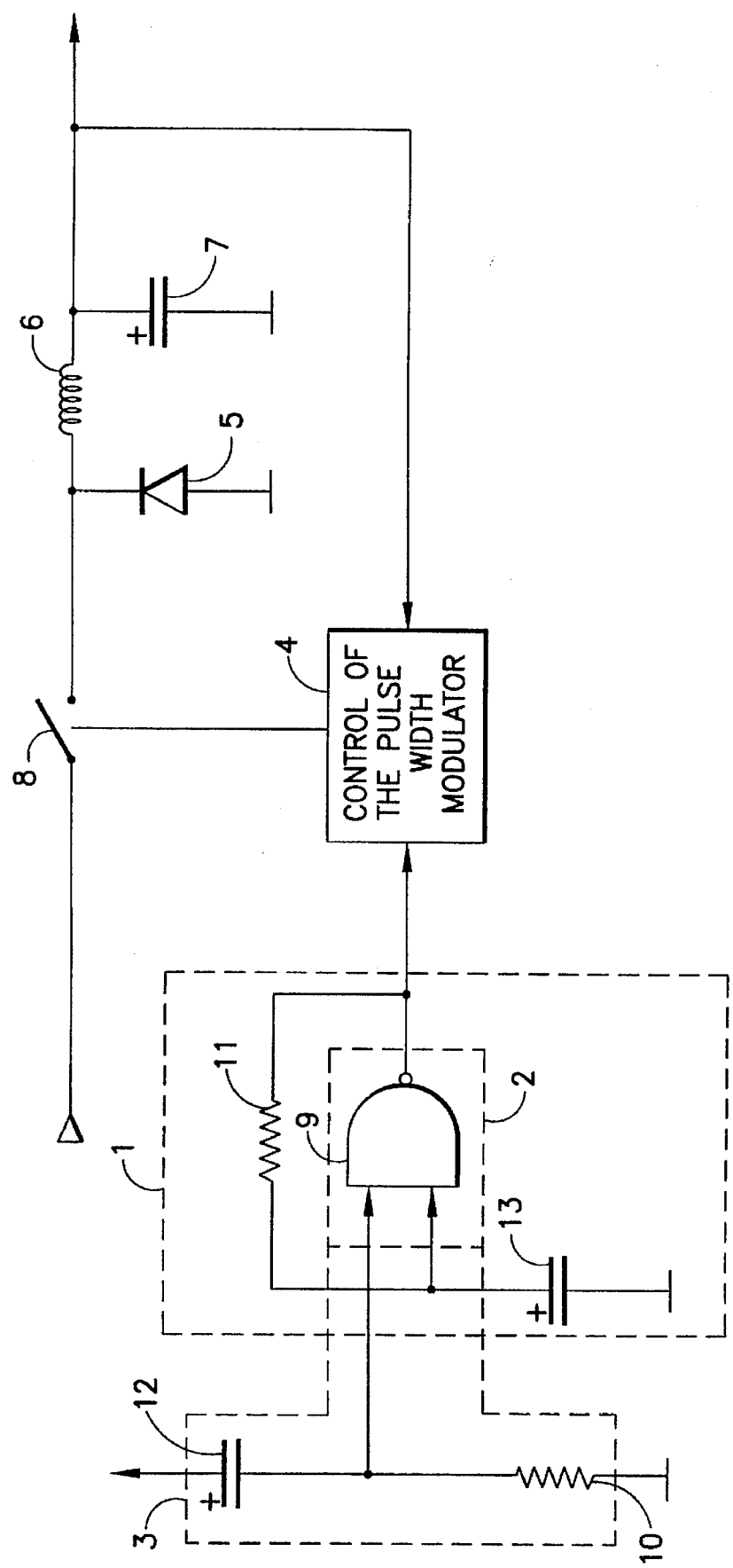
FIG. 2 shows a more detailed diagrammatic illustration of the apparatus of FIG. 1

FIG. 2 shows a slightly more detailed diagrammatic illustration of the apparatus in accordance with the invention. The identification of the charger is formed by using logic NAND circuit 9 (an AND circuit having an inverting output), from where the identification is transmitted to control block 4 of the pulse width modulator. The resistances shown in FIG. 2 are marked with numbers 10 and 11 and the capacitors are marked with numbers 12 and 13. A switching transistor or field effect transistor functions as switch 8 and takes the charging voltage containing the identification via inductance 6 to the output of the charger. The pulse identification is formed until capacitor 12 is charged, switch 8 being left switched on thereafter.

In view of the foregoing description it will be evident to a person skilled in the art that various modifications may be made within the scope of the invention. For example, the accessory device need not be a battery charger but could be some other accessory, and the electronic device need not be just a portable telephone. Additionally, the modulation of the charging voltage may comprise varying the charging voltage as well as switching it on or off.

The scope of the present disclosure includes any novel feature or combination of features disclosed therein either explicitly or implicitly or any generalization thereof irrespective of whether or not it relates to the claimed invention or mitigates any or all of the problems addressed by the present invention. The applicant hereby gives notice that new claims may be formulated to such features during prosecution of this application or of any such further application derived therefrom.

What I claim is:

1. Identification apparatus for identifying a charger device for rechargeable batteries of portable electronic devices, comprising a charger device for providing a charging voltage, a low pass filter coupling means connected between the charger device and for coupling the charging voltage of the charger accessory to the electronic device, and modulation means for modulating a signal on the coupling means to provide an identification signal in accordance with identity data for the charger device.

2. Identification apparatus according to claim 1, wherein the modulation means includes a switch means operable to activate and de-activate the coupling means.

3. Identification apparatus according to claim 1, further including means connected to the modulation means for generating the identify data.

4. Identification apparatus according to claim 1, wherein the modulation means includes control means connected to the means for generating the identity data to control the modulation means in accordance with the identity data for superimposing a pulse ratio, pulse length, or pulse count signal on the signal on the coupling means.

5. Identification apparatus according to claim 1, wherein the modulation means includes a control means and wherein there is further provided timing means connected to the control means of the modulation means for determining a time during which the modulation means is operable.

6. Identification apparatus according to claim 5, wherein the timing means comprises a timer and a switch operable in accordance with the timer to decouple the identity data from the control means.

7. Identification apparatus according to claim 2 wherein the switch means comprises a switching transistor or field effect transistor.

8. Identification apparatus according to claim 4 further including:
   a logic NAND circuit connected to said control means for providing identity data to the control means.,
   a first resistance means, and
   a first capacitance means connected to one input of the NAND circuit and a second resistance and a second capacitance connected to another input of the NAND circuit, wherein
   the identity data is formed by using the logic NAND circuit, from where the identity data is coupled to the control means for a pulse width modulator.

9. An identification method for a charger device, comprising transmitting an identity signal from the charger device to an electronic device coupled thereto by modulating a signal transmitted between the charger device and the electronic device in accordance with identity data for the charger device.

10. A method according to claim 9, wherein the identity signal is modulated by switching the identity signal on or off.

11. Identification apparatus according to claim 3 wherein said means for generating the identity data is a bit generator.

12. Identification apparatus according to claim 3 wherein said means for generating the identity data is a charger device.

13. A method for identifying a charger device providing a charging voltage for rechargeable batteries of portable devices, characterized in that the charger device transmits an identification of the charger device to the portable device via a charging cable by switching the charging voltage on and off by using given pulse ratio, pulse length or pulse count signals.

* * * * *